United States Patent [19]

Tsujioka

[11] Patent Number: 5,130,847
[45] Date of Patent: Jul. 14, 1992

[54] COPYING MACHINE INCLUDING ILLUMINATION APPARATUS

[75] Inventor: Hiroshi Tsujioka, Ikoma, Japan

[73] Assignee: Sharp Kabushiki Kaisha, Osaka, Japan

[21] Appl. No.: 289,310

[22] Filed: Dec. 23, 1988

[30] Foreign Application Priority Data

Dec. 26, 1987 [JP] Japan ............................ 62-198037[U]
Dec. 26, 1987 [JP] Japan ............................ 62-198039[U]

[51] Int. Cl.$^5$ ............................................. H04N 1/024
[52] U.S. Cl. .................................... 358/473; 358/475; 382/59
[58] Field of Search ..................... 358/472, 473, 475; 382/59; 250/578, 566

[56] References Cited

U.S. PATENT DOCUMENTS

| 4,523,235 | 6/1985 | Rajchman | 358/472 |
| 4,641,982 | 2/1987 | Rekewitz | 400/690.1 |
| 4,819,083 | 4/1989 | Kawai et al. | 358/473 |

Primary Examiner—Edward L. Coles, Sr.

[57] ABSTRACT

A copying machine in a casing has a window in the casing for visually recognizing a printing position and image pickup position, so that the printing position and image pickup position may be adjusted through the window. An illumination apparatus to be used in the copying machine is located in the casing, and the light from a light source is led onto the imaging surface by an optical guide member, which illuminates the illuminating position such as the image pickup position. Since the light from the light source can be shielded by the casing, the illuminating position can be recognized visually through the window.

13 Claims, 9 Drawing Sheets

COPYING MACHINE INCLUDING ILLUMINATION APPARATUS

BACKGROUND OF THE INVENTION

1. Field of the Invention

This invention relates to a copying machine for example a handy copier having image pickup means disposed within a casing and constructed so as to print an image obtained from the image pickup means by printing means. The invention also relates to an illumination apparatus preferably used to illuminate the image pickup position in the copying machine.

2. Description of the Prior Art

Figure 1:
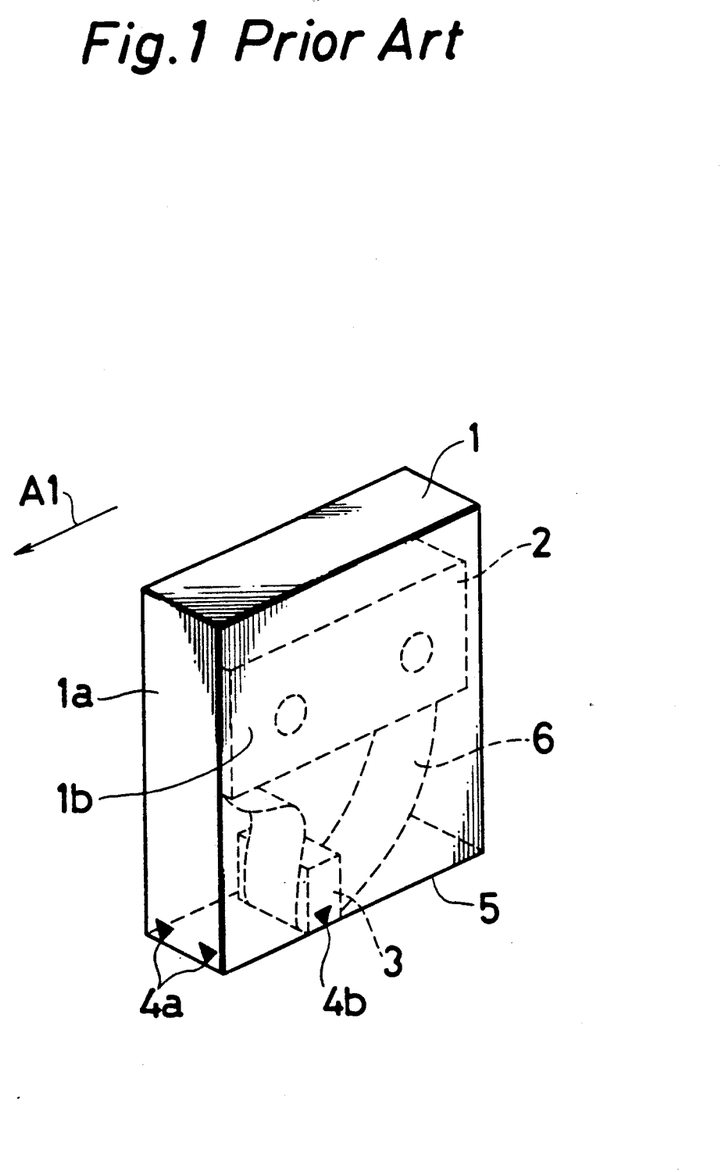
FIG. 1 is a schematic perspective view showing a conventional copying machine.

A conventional copying machine generally known as a handy copier is shown in FIG. 1. A casing 1 contains image pickup means composed of image sensor, lens and other structure (not shown), and printing means composed of transfer type thermal ribbon case 2, thermal head 3 and other structure (not shown). A lower surface 5 of the casing 1 is disposed on the reading surface of the document to be read, and the image pickup means is provided opposite thereto, and by scanning in the direction of arrow A1 in this condition, the content displayed on the reading surface is picked up, and the thermal head 3 is directed to a desired copying area of the other document, and a thermal ribbon 6 is heated by the thermal head 3, and the content picked up by the image pickup means is duplicated by printing on the document. When picking up the image and printing in this manner, the copying machine is held by hand, and is moved on the document in the direction of the arrow A1 to scan and pickup the image. The copying machine is then moved on the sheet of paper to be printed on in the direction the arrow A1, so that the image is printed on the paper.

In this prior art, however, when starting up the printing operation, positioning of the thermal head 3 on the document surface is effected by reference to positioning marks 4a, 4b provided on two side faces 1a, 1b of the casing 1. These marks correspond to the mounting position of the thermal head 3, and it takes a long time to adjust the position correctly. In particular, it took a great deal of time to print while feeding several lines. Besides, when picking up a desired image position, it is impossible to view the pickup position from outside the casing 1, and it was therefore not possible to confirm the copying position from outside the casing 1 to pick up by accurately and securely picking up the display.

SUMMARY OF THE INVENTION

It is a primary object of the invention to provide a copying machine capable of easily and accurately positioning the printing head on the document when printing in order to solve the above problems of the prior art.

To achieve the above object, the invention comprises a copying machine having image pickup means and printing means both of which are disposed in a casing, an image being picked up by the image pickup means and printed by the printing means wherein the casing is provided with position confirming window means for confirming a position with relation to the printing surface of printing head part of which the printing means is composed.

According to the invention, it is possible to adjust the position while confirming the position with respect to the printing surface of the printing head part through the position confirming window means when printing.

Furthermore, with the invention, it is possible to easily and accurately adjust the position to the printing surface of the printing head part when printing by confirming the position through the position confirming window means, so that the printing may be done easily.

The invention further comprises a copying machine comprising:

a casing having an opening facing to an object to be copied and being made of an opaque material;

image pickup means contained in the casing for picking up to scan a surface of the object which is to be picked up and faces to the opening in a predetermined scanning direction, by moving the casing in the predetermined scanning direction;

memory means for storing an image picked up by the image pickup means;

Printing means contained in the casing for printing the memory content in the memory means onto a printing position of a recording medium disposed at the opening; and window means for visually recognizing from outside of the casing the pickup position of the image pickup means at the opening and the printing position of the printing means.

According to the invention, by scanning the casing in the scanning direction in the condition where the opening of the casing is opposite to the pickup surface of the object to be copied, the image surface is scanned and picked up by the image pickup means. The image picked up in the image pickup means is stored by the memory means, and the image from the memory is printed onto the recording medium disposed at the opening by the printing means.

Thus, when picking up and printing, since the pickup position and printing position can be viewed from outside the casing through the window means, the desired image area on the pickup surface can be accurately and easily positioned and picked up, and the image accurately picked up in this way can be accurately and easily adjusted to the desired position on the recording medium to be printed.

In the invention, since the pickup position and printing position can be viewed from outside the casing through the window means, positioning at the time of pickup and printing can be effected accurately and easily, and the efficiency of the copying work may be enhanced. Furthermore, since the image accurately picked up from the desired pickup position can be correctly printed in the desired printing position, the convenience of use is enhanced.

In a preferred embodiment, the window means is accomplished by placing a panel shaped cover made of a transparent material at a notch formed in a side portion of the casing.

In another preferred embodiment, the image pickup means is disposed at a downstream side in the scanning direction of the printing means, and the window means is disposed at a downstream side in the scanning direction of the image pickup means.

In a still further preferred embodiment, the casing is provided with means for illuminating by emitting light to the plane of the image pickup position.

In a further different preferred embodiment, the illuminating means disposed in the casing comprises:

(a) a light source;

(b) a rod lens for focusing light from the light source; and (c) an optical guide member for guiding the light from the rod lens into the image pickup position, which is provided with (c1) a guiding portion for guiding the light from the rod lens to the vicinity of the image pickup position in the state of parallel light; and (c2) a focusing portion for focusing the light guided by the guiding portion into the image pickup position, wherein the light source and the rod lens are disposed at positions remoter from the image pickup position than the notch, and are at least partly shielded by the casing.

In another preferred embodiment, the image pickup means comrpises:

a lens disposed at a spacing from the image pickup position; and a photo detector disposed at an opposite position of the lens with relation to the image pickup position, wherein the lens images the reflected light form the plane of the image pickup position into the photo detector.

In a still different preferred embodiment, the window means is a notch formed in a side portion of the casing, and the illuminating means disposed in the casing comprises:

(a) a light source;

(b) a rod lens for focusing light from the light source; and (c) an optical guide member for guiding the light from the rod lens into the image pickup position, which is provided with (c1) a first guiding portion of which one end is disposed near the rod lens and the other end is extended to vicinity of the notch, for guiding light from the rod lens entering from one end side to the other end side in form of parallel light;

(c2) a second guiding portion which is continuous to the other end of the first guiding portion, for guiding the light guided by the first guiding portion nearly to vicinity of the image pickup position in form of parallel light; and (c3) a focusing portion for focusing the light guided by the second guiding means into the image pickup position, wherein the second guiding portion of the optical guide member is disposed within the notch in a manner to plug the notch.

It is a still further object of the invention to provide an illumination apparatus, preferably used in a copying machine, designed to focus the light to an illuminating position such as copying or image pickup position by guiding the light from the light source.

To achieve the above object, the invention provides an illumination apparatus preferably used in a copying machine comprising:

(a) a light source;

(b) a lens for transforming light from the light source into parallel light; and (c) an optical guide member for guiding light from the lens to an illuminating position, which is provided with (c1) a guiding portion possessing a specified length for guiding parallel light from the lens to vicinity of the illuminating position; and (c2) a focusing portion for focusing the parallel light to the illuminating position disposed at an end of the guiding portion.

According to the invention, since an optical guide member is disposed with the light source, lens and illuminating position, the illuminating position, light source and the lens may be disposed at distant positions, so that the illuminating position may be easily and clearly recognized visually without being affected by the light from the light source or lens. Accordingly, since the illuminating position is near the focusing portion of the optical guide member, the illuminating position can be easily and accurately recognized visually by reference to the focusing portion when positioning to the illuminating position, so that the positioning may be effected easily and accurately.

In a preferred embodiment, the light source, lens and optical guide member are disposed within the casing made of an opaque material; and the casing is provided with window means for recognizing the illuminating position from outside the casing, whereby the illuminating position can be visually recognized from the outside the casing through the window means.

In a different preferred embodiment, the window means is includes forming a notch in the casing, and disposing a panel shaped cover made of a transparent material in the notch.

BRIEF DESCRIPTION OF THE DRAWINGS

These and other objects of the invention, as well as the features and benefits thereof, will be more clearly appreciated and understood from the following detailed description taken in conjunction with the appended drawings, in which.

DETAILED DESCRIPTION OF THE PREFERRED EMBODIMENTS

Figure 2:
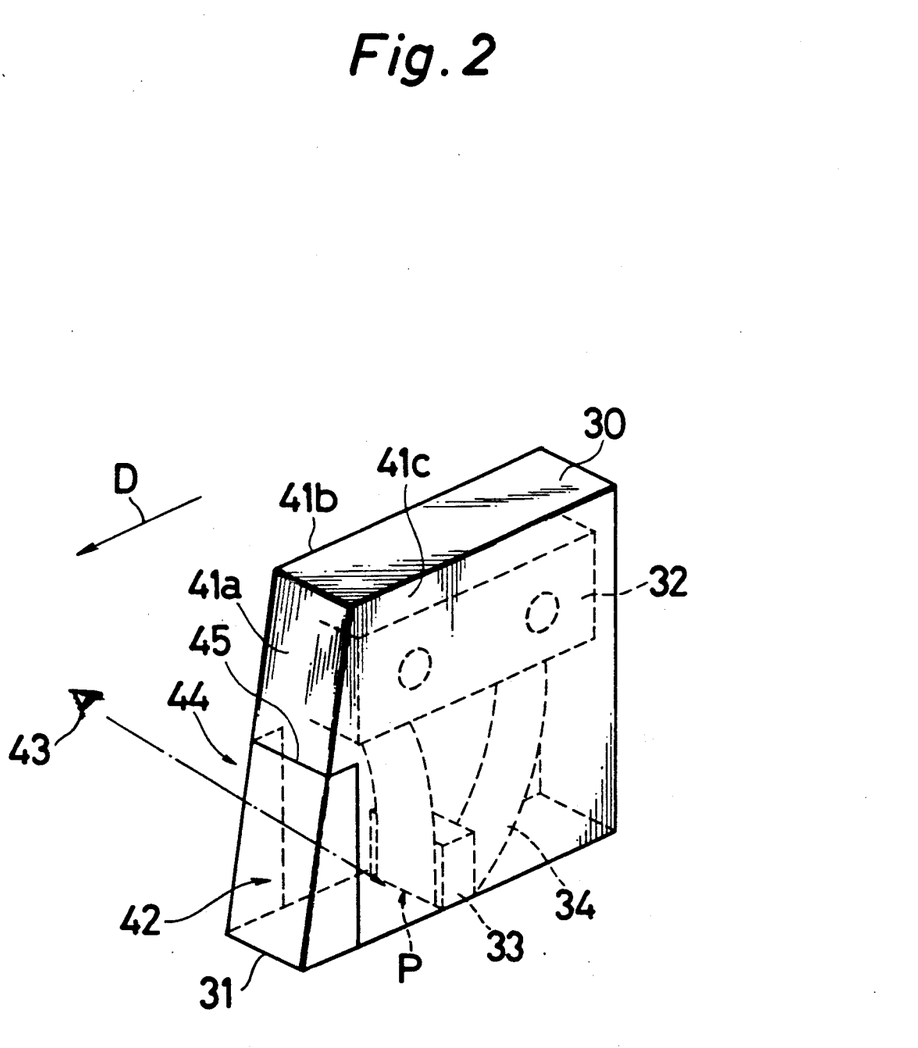
FIG. 2 is a schematic perspective view showing a copying machine in an embodiment of the invention.
Figure 3:
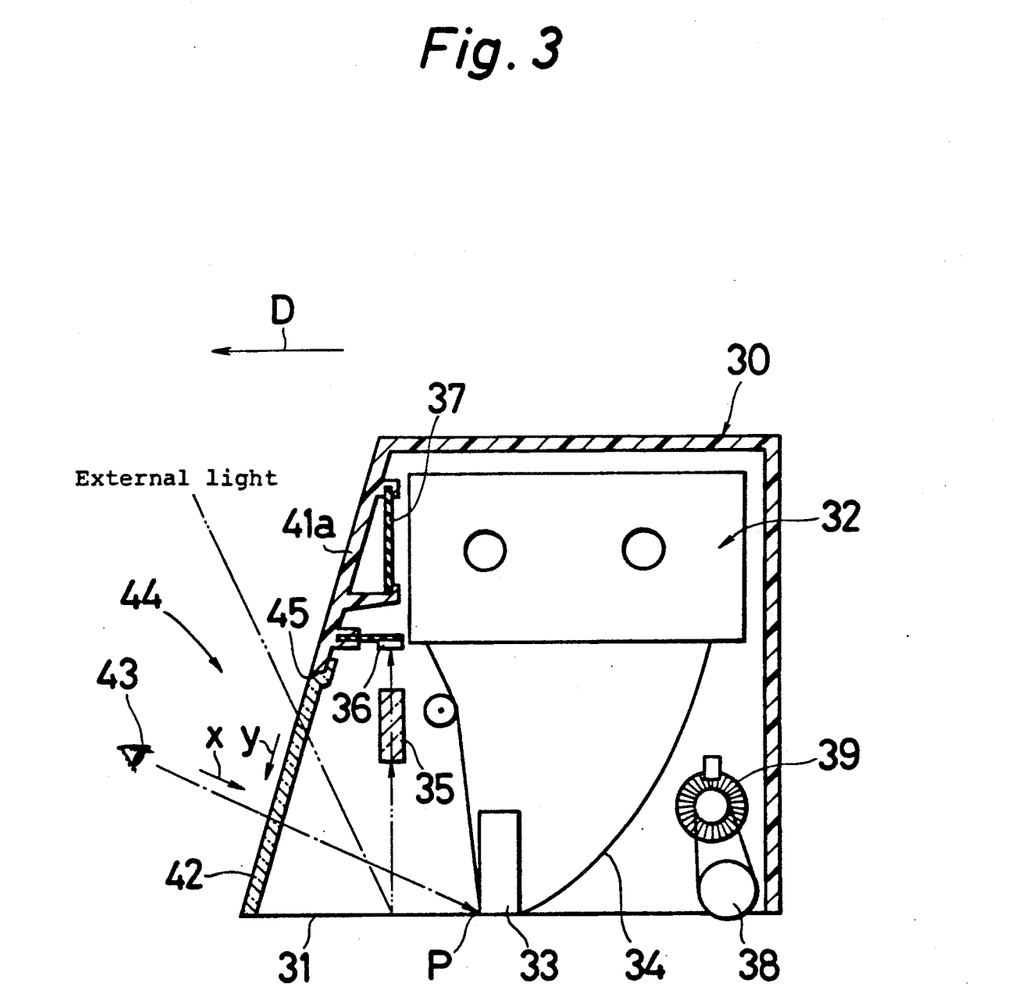
FIG. 3 is a sectional view showing the internal structure of the same copying machine.

Referring now to the drawings, some of the preferred embodiments of the invention are described in details below. FIG. 2 is a schematic perspective view showing a copying machine in one of the embodiments of the invention, and FIG. 3 is a sectional view showing the internal structure of the same copying machine.

For example, in a copying machine generally known as a handy copier, a lower surface 31 of a casing 30 is open, and the image pickup means and printing means are provided therein. In the upper part of the casing 30, a transfer type thermal ribbon case 32 is detachably mounted, and in the lower part, a thermal head 33 is used as the printing head, and a thermal ribbon 34 to be stored in the transfer type thermal ribbon case 32 is disposed so as to pass through this thermal head 33. A rod lens array 35 is disposed so as to face an opening formed in the lower surface 31 of the casing 30, and an image sensor 36 is provided in its upper part. A circuit substrate 37 comprises a circuit for processing the image pickup signals and creating and processing printing signals according to the image pickup signals. A movable roller 38 is rotated when the copying machine is moved in the direction of arrow D on the document when picking up the image and printing, and the amount of its rotation is designed to be detected by an encoder 39 cooperating with the movable roller 38.

The window means 44 which is a feature of the invention is set forth hereinafter. The casing 30 has its side 41a which is inclined, and a cover 42 made of synthetic resin having a light transmitting property as a transparent material is disposed in a notch 45 opening from this side portion 41a to its adjacent both sides 41b, 41c.

Through the thus disposed cover 42, external light necessary for imaging enters into the casing 30 when picking up the image, and the image position can be confirmed, for example, by the user, through the cover 42 when starting the pickup. At the same time, when starting the printing operation, positioning of the thermal head 33 to the printing position P on the document can be easily confirmed by the use of cover 42.

Accordingly, when positioning upon start of image pickup and printing through the cover 42, since the cover 42 is inclined continuously from the side portion 41a, the viewing direction x of the eye 43 and the inclining direction y of the outer surface of the cover 42 are nearly orthogonal to each other, and the reflected image on the outer surface of the cover 42 hardly effects the eye 43, and therefore the printing position P can be easily recognized, and positioning is easy.

In this embodiment, moreover, by disposing the cover 42 made of synthetic resin having a light transmitting property in part of the casing 30, the position P is designed to be recognized through the cover 42, but what also may be done is to form the entire casing 30 by using a light transmitting synthetic resin material, and it is possible to view the printing position P at any desired angle from outside the casing 30, and the convenience of use is further enhanced.

Figure 4:
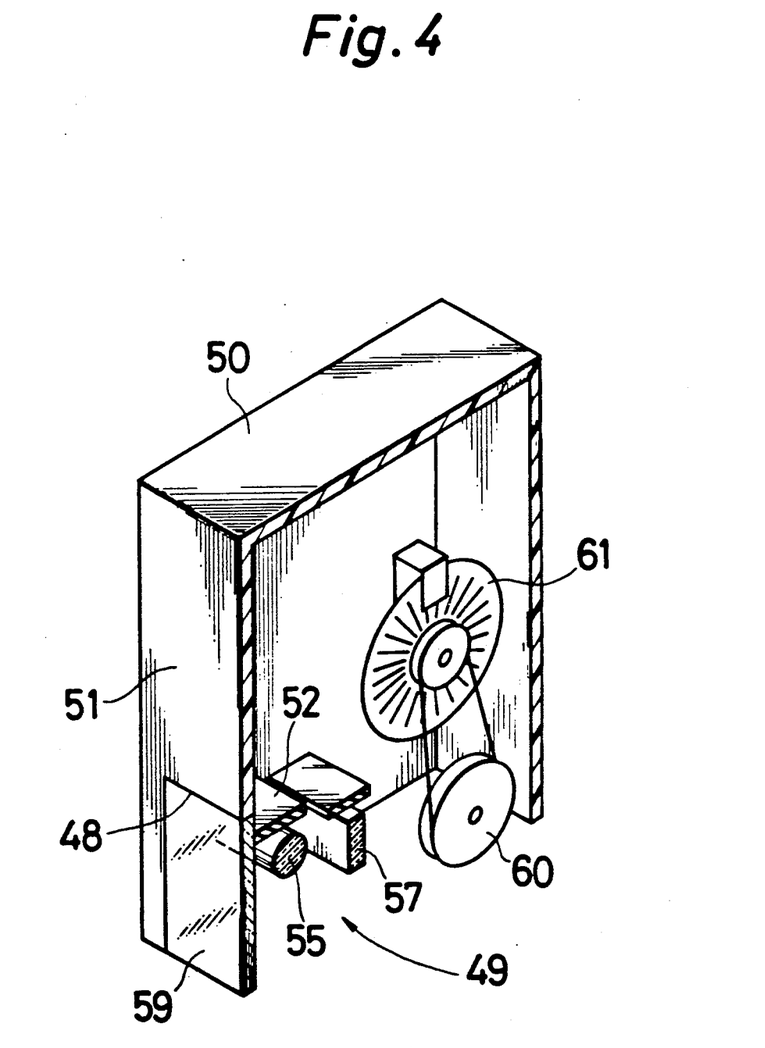
FIG. 4 is a schematic perspective view showing the internal structure of a copying machine in a different embodiment.
Figure 5:
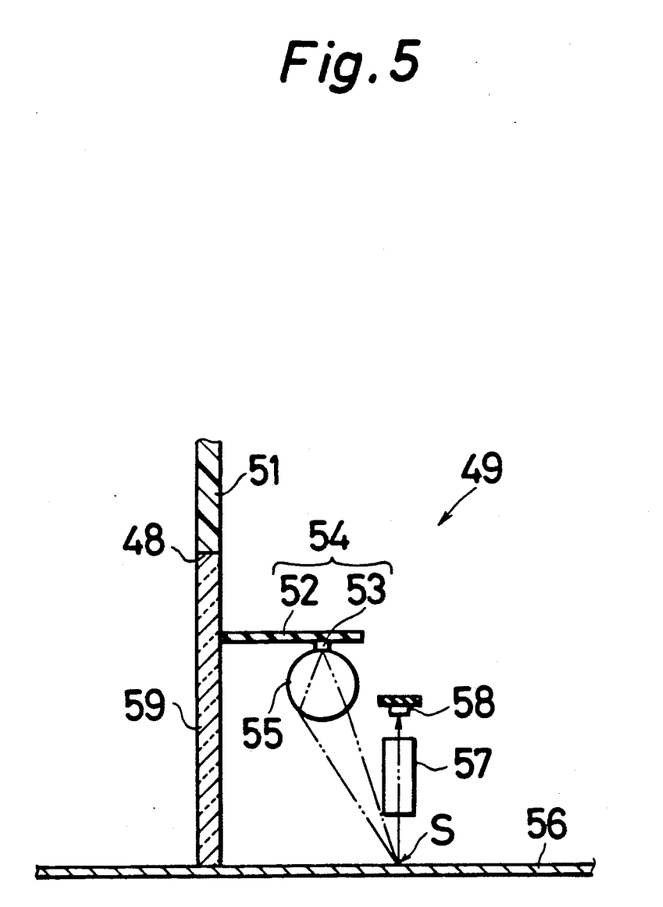
FIG. 5 is a partially expanded sectional view showing an illumination apparatus disposed in the same copying machine.

In another embodiment of the invention, illuminating means 49 are disposed in a copying machine. FIG. 4 is a schematic perspective view showing the internal structure of this type of copying machine and FIG. 5 is a partially magnified sectional view showing the structure of the illuminating means 49 disposed in the same copying machine. In a copying machine known as an image scanner, in the lower part in one side portion 51 of a casing 50, light emitting means 54 having an LED chip array 53 disposed on a circuit substrate 52, and the illuminating means 49 possessing a rod lens 55 are installed. The illuminating light from the LED chip array 53 is focused by the rod lens 55, and is designed to illuminate the image pickup position (illuminating position) S on the document 56. The reflected light of the document 56 illuminated by the illuminating means 49 is received by a contract image sensor 58 through a Selfoc lens 57 (trade mark) as a lens to pick up the image.

A notch 48 is formed in one side 51 of the casing 50, and in this notch 48, a cover 59 made of a transparent material is disposed as the window means for confirmation of the image pickup position S. When picking up the image, this apparatus is directed to the scanning, direction D to scan on the document 56, and the movable roller 60 rotates, and the amount of rotation of the roller 60 is detected by the encoder 61.

Figure 6:
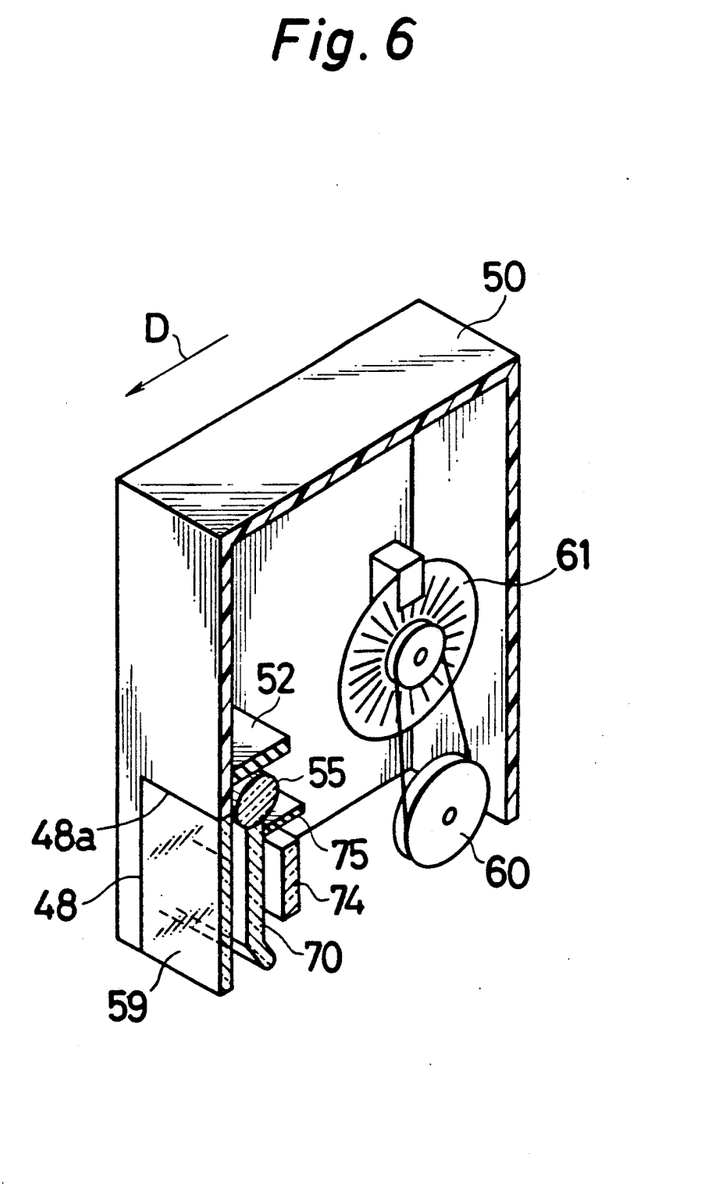
FIG. 6 is a schematic perspective view showing the internal structure of a copying machine of a further different embodiment.
Figure 7:
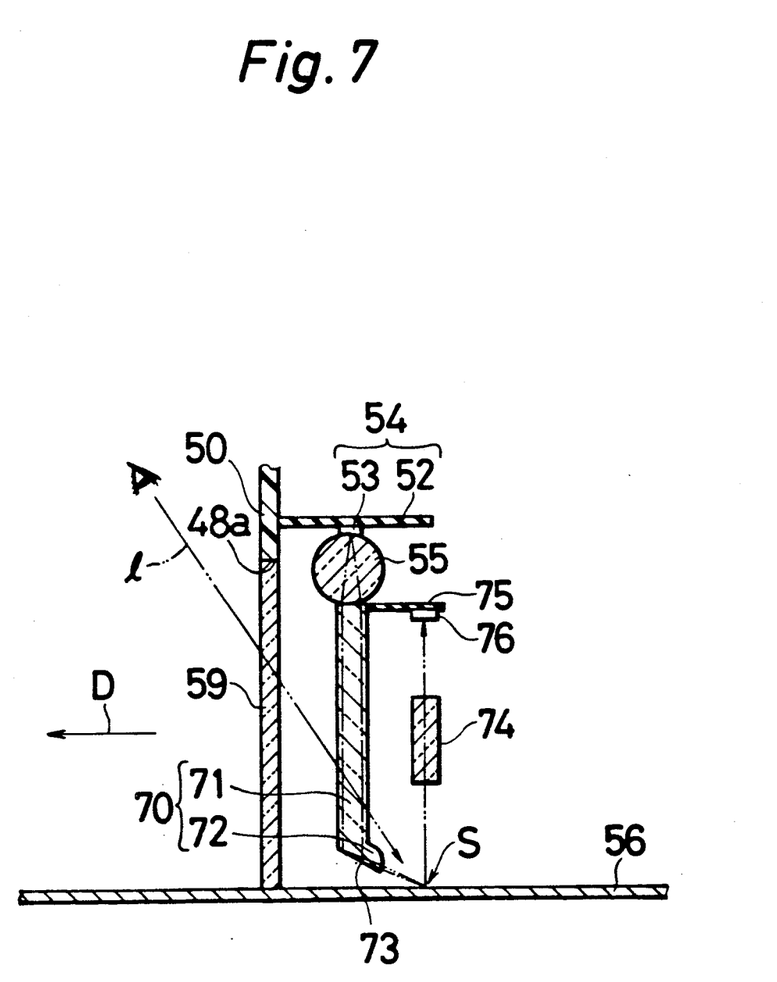
FIG. 7 is a partially expanded sectional view showing an illumination apparatus disposed in the same copying machine.

FIG. 6 is a schematic perspective view showing the internal structure of a copying machine of a further different embodiment of the invention, and FIG. 7 is a partially magnified sectional view showing the illuminating means disposed in a copying machine. As stated above, by providing the casing 50 with a cover 59, the operator can visually recognize the image pickup position S through the cover 59. It is therefore possible to accurately and securely pick up the display on the document 56 by scanning in the scanning direction D by disposing the copying machine of the embodiment so that the pickup position S may be located in a desired imaging area on the document 56, and deviation of the image pickup position S from the desired imaging area nay be considerably decreased, but in the embodiment shown in FIGS. 4 and 5, the distance between the rod lens 55 and the image pickup position S cannot be set so long, owing to the relation with the focusing distance of the rod lens 55, and the light emitting part 54 and rod lens 55 must be disposed adjacently to the inner side of the cover 59. Therefore, the light emitting means 54 and the rod lens 55 are located outside through the cover 59, and when viewing the image pickup position S through the cover 59, the light from the light emitting means 54 and the rod lens 55 directly gets into the eye, and it is difficult to confirm the position. Accordingly, in this embodiment, near the upper end part 48a of the notch 48 in the casing 50, the light emitting means 54 having an LED chip array 53 disposed on the substrate 52 and the rod lens 55 are installed, and from the rod lens 55 to its lower part, an optical guide member 70 made of an acrylic resin is disposed so as to be positioned parallel to the cover 59. The optical guide member 70 is composed of a panel shaped guiding portion 71, and a focusing portion 72 having a lens-shaped section disposed at the lower end, and the lower end face 73 of the guiding portion 71 is formed in a slope.

Just above the image pickup position S, a Selfoc lens (trade mark) 74 is provided, and a contact type image sensor 76 mounted on a substrate 75 is disposed in its upper part. When this apparatus is moved in the scanning direction D upon image pickup, the movable roller 60 rotates, and its rotation amount is detected by an encoder.

Figure 8:
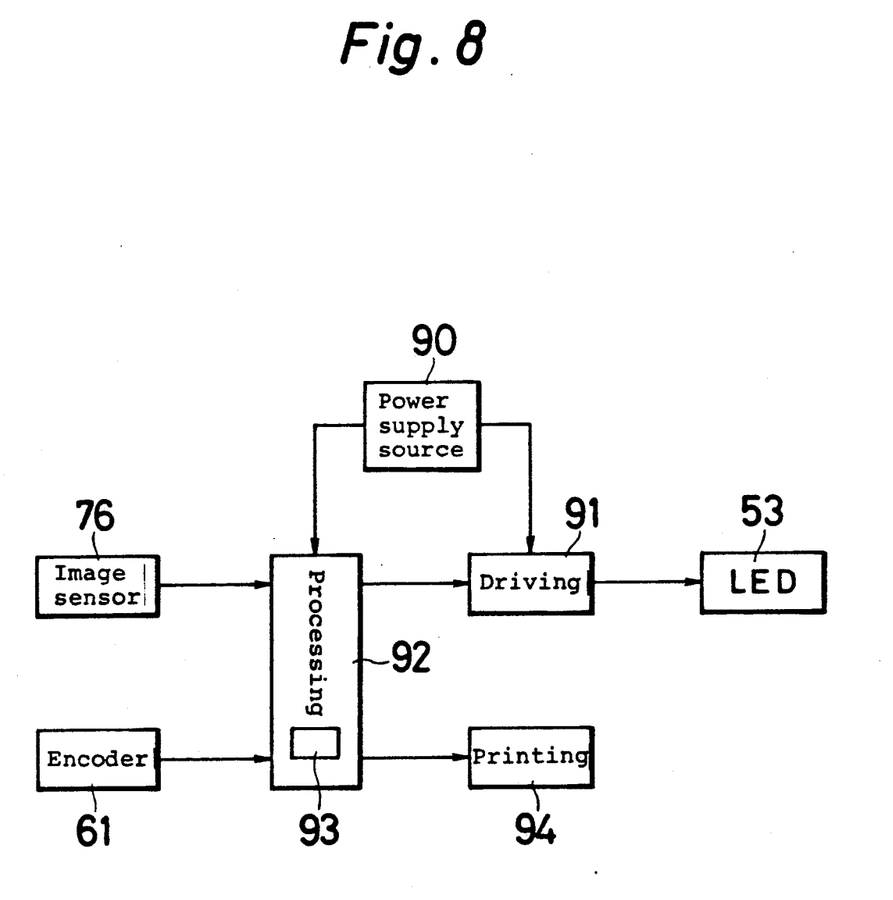
FIG. 8 is a block diagram for explaining the operation of the copying machine of the embodiment shown in FIGS. 6 and 7.

FIG. 8 is a block diagram explaining the operation of the copying machine of the embodiment shown in FIGS. 6 and 7. The reading scanning of the copying machine in FIGS. 6 and 7 is effected in the state of the movable roller 60 being kept in contact with the document 56, by moving the machine in the scanning direction D. The illumination of the image pickup position S is herein set forth. When the power switch (not shown) disposed in the casing 50 is turned on, a driving electric power is supplied from a power supply source 90 into a driving circuit 91 and a processing circuit, 92 made of microcomputer other structure. From the driving circuit 91 current for to the LED chip array 53, and the LED chip array 53 emits light at specified intensity of illumination. The light from the LED chip array 53 is transformed into parallel light by the rod lens 55, and this parallel light enters the guiding portion 71 of the optical guide member 70 and is led downward, and is reflected sideways on the inclined lower end face 73 of the guiding portion 71. This reflected light is deflected by the focusing portion 72, and is focused on the image pickup position S.

The reflected light at the thus illuminated image pickup position S is received by the contact type image sensor 76 through 74, and Selfoc lens 74, and this received signal is amplified in the processing circuit 92, and is shaped in waveform and is stored in a memory region 93 which is the memory means in the processing circuit 92. The memory stored in the memory region 93 is applied to printing means 94 such as a word processor connected to the copying machine, and is printed out.

When starting this reading scanning, it is necessary to match the image pickup position S with the desired imaging area on the document 56, and this positioning is achieved by visually checking if the image pickup position S is located in the desired imaging area through the optical guide member 70, and moving the copying machine so that the image pickup position (illuminating position) S overlaps the imaging area. The viewing line "l" in this visual checking runs obliquely toward the image pickup position S through the optical guide member 70. By contrast, since the light emitting means 54 and rod lens 55 are located near the upper end part 48a of the notch 48, the light from the LED chip array 53 and rod lens 55 does not get into the eye when viewing, and therefore positioning can be done easily.

Furthermore, since the image pickup position S is near the focusing portion 72 of the optical guide member 70, the image pickup position S can be easily and accurately observed visually by reference to the focusing portion 72 when positioning.

Figure 9:
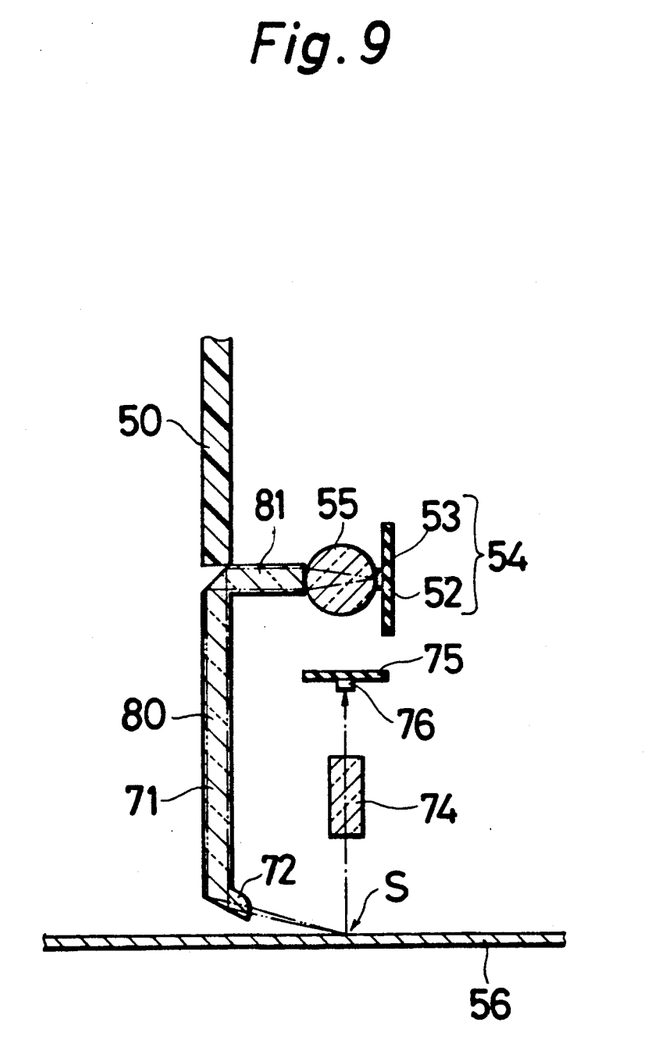
FIG. 9 is a partially expanded sectional view of a still other embodiment of the invention.

FIG. 9 is a partially magnified sectional view of a copying machine in a still a different embodiment of the invention. In this embodiment, the cover 56 in the embodiment shown in FIGS. 6 and 7 is replaced by the optical guide member 80 having the same function as cover 56, and a bent portion 81 provided in its upper part, and through this bent portion 81 the parallel light from the rod lens 55 is led into the guiding portion 71. As a result, the cover 56 is not needed, and the number of parts may be reduced, while the size of the machine can be reduced because it is not necessary to keep an exclusive space for the optical guide 80 in the casing 50.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims as therefore intended to be embraced therein.

What is claimed is:

1. A hand held copying machine including image pickup means and means for printing, both located in a casing, the casing having an end portion which is a forward portion of the casing when copying and printing is performed, said printing means including a printing head for printing information on a document, wherein the improvement comprises:
   a transparent window formed in the end portion of the casing so that a portion of an image to be copied by the image pickup means and a printing position where the print head prints an image can be identified through the transparent window.

2. The apparatus of claim 1 wherein by visual viewing through the transparent window the printing position can be directly identified.

3. A copying machine comprising:
   a casing formed of an opaque material, said casing including an opening for facing an object to be copied;
   image pickup means contained in the casing which faces the opening in a predetermined scanning direction, for picking up an object image by scanning a surface of the object, when the casing is moved in said predetermined scanning direction;
   memory means for storing an image picked up by the image pickup means;
   printing means contained in the casing for printing the content of the memory means onto a printing position of a recording medium disposed at said opening; and
   window means formed on a side portion of the casing for permitting the recognition of both the pickup portion of the image pickup means and the printing portion of the printing means.

4. A copying machine comprising:
   a casing formed of an opaque material, said casing including an opening facing an object to be copied;
   image pickup means contained in and facing the opening in the casing in a predetermined scanning direction, for picking up an object image by scanning a surface of the object, when the casing is moved in said predetermined scanning direction;
   memory means for storing an image picked up by the image picked up by the image pickup means;
   printing means contained in the casing for printing the content of the memory means onto a printing position of a recording medium disposed at said opening; and
   window means for visually recognizing from the outside of the casing the pickup position of the image pickup means at the opening and the printing position of the printing means, said window means being composed of a panel shaped cover made of transparent material is placed at a notch in a side portion of the casing.

5. A copying machine according to claim 4, wherein the image pickup means is disposed at a downstream side in the scanning direction of the printing means, and the window means is disposed at a downstream side in the scanning direction of the image pickup means.

6. A copy machine according to claim 4, wherein the casing is provided with means for illuminating by emitting light to the plane of the image pickup position.

7. A copy machine according to claim 4, wherein the image pickup means comprises:
   a lens disposed at a spacing from the image pickup position; and
   a photo detector disposed at an opposite position of the lens with relation to the image pickup position, wherein
   the lens images the reflected light from the plane of the image pickup position into the photo detector.

8. A copying machine comprising:
   a casing formed of an opaque material, said casing including an opening for facing an object to be copied;

image pickup means contained in the casing which faces the opening in a predetermined scanning direction, for picking up an object image by scanning a surface of the object, when the casing is moved in said predetermined scanning direction;

memory means for storing an image picked up by the image pickup means;

printing means contained in the casing for printing the content of the memory means onto a printing position of a recording medium disposed at the opening;

window means for visually recognizing from the outside of the casing the pickup position of the image pickup means at the opening and the printing position of the printing means; and means located in the casing, for illuminating by emitting light to the plane of the image pickup position said means for illuminating including a light source a rod lens for focusing light from the light source;

an optical guide member for guiding the light from the rod lens into the image pickup position, which is provided with a guiding portion for guiding the light from the rod lens to the vicinity of the image pickup position in the state of parallel light; and a focusing portion for focusing the light guided by the guiding portion into the image pickup position, wherein the light source and the rod lens are disposed at positions remoter from the image pickup position than the notch, and are at least partly shielded by the casing.

9. A copying machine comprising:

a casing formed of an opaque material, said casing including an opening for facing an object to be copied;

image pickup means contained in the casing which faces the opening in a predetermined scanning direction, for pickup up an object image by scanning a surface of the object, when the casing is moved in said predetermined scanning direction;

memory means for storing an image picked up by the image pickup means;

printing means contained in the casing for printing the content of the memory means onto a printing position of a recording medium disposed at the opening;

window means located in a notch in a side portion of the casing for visually recognizing from the outside of the casing the pickup position of the image pickup means at the opening and the printing position of the printing means; and means located in the casing, for illuminating by emitting light to the plane of the image pickup position said means for illuminating including a light source;

a rod lens for focusing light from the light source;

an optical guide member for guiding the light from the rod lens into the image pickup position, which is provided with a first guiding portion of which one end is disposed near the rod lens and the other end is extended to vicinity of the notch, for guiding light from the rod lens entering from one end side to the other end side in form of parallel light;

a second guiding portion which is continuous to the other end of the first guiding portion, for guiding the light guided by the first guiding portion nearly to vicinity of the image pickup position in form of parallel light; and a focusing portion for focusing the light guided by the second guiding means into the image pickup position, wherein the second guiding portion of the optical guide member is disposed within the notch in a manner to plug the notch.

10. An illumination apparatus preferably used in a copying machine comprising:

a casing formed of an opaque material, said casing containing a light source, a lens for transforming light from the light source into parallel light and an optical guide member for guiding light form the lens to an illuminating position said guiding member including:

a guiding portion possessing a specified length for guiding parallel light form the lens to vicinity of the illuminating position; and a focusing portion for focusing the parallel light to the illuminating position disposed at an end of the guiding portion.

11. A hand held copying machine having image pickup means and including means for printing located in a casing, said printing means including a printing head for printing information on a document wherein the improvement comprises:

a transparent window formed in an end portion of the casing so that a printing position where the print head prints an image can be identified through the transparent window, wherein said end portion of the casing including the window is inclined so that a reflected image on said transparent window does not substantially interfere with an eye view through the window into the casing.

12. A hand held copy machine having image pickup means and including means for printing located in a casing, said printing means including a printing head for printing information on a document wherein the improvement comprises:

a transparent window formed in an end portion of the casing so that a printing position where the print head prints an image can be identified through the transparent window, wherein said transparent window is of a size effective to allow external light necessary for imaging to be transmitted into the casing.

13. The hand held copying machine according to claim 12, wherein said end portion of the casing including the window is inclined so that a reflected image on said transparent window does not substantially interfere with an eye view through the window into the casing.

* * * * *